(12) United States Patent
Van De Sluis et al.

(10) Patent No.: US 7,277,947 B1
(45) Date of Patent: Oct. 2, 2007

(54) SYSTEM AND METHOD FOR SUPPORTING ONGOING ACTIVITIES AND RELOCATING THE ONGOING ACTIVITIES FROM ONE TERMINAL TO ANOTHER TERMINAL

(75) Inventors: Bartel M. Van De Sluis, Eindhoven (NL); Handoko Kohar, Eindhoven (NL); Johannes A. Jansen, Eindhoven (NL); Josephus H. Eggen, Eindhoven (NL); Sebastiaan A. F. A. Van Den Heuvel, Eindhoven (NL); Mark Henricus Verberkt, Eindhoven (NL); Huibert H. Eggenhuisen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/601,458

(22) PCT Filed: Dec. 2, 1999

(86) PCT No.: PCT/EP99/09595

§ 371 (c)(1),
(2), (4) Date: Aug. 2, 2000

(87) PCT Pub. No.: WO00/34891

PCT Pub. Date: Jun. 15, 2000

(30) Foreign Application Priority Data

Dec. 4, 1998 (EP) .................................. 98204087

(51) Int. Cl.
*G06F 15/16* (2006.01)
(52) U.S. Cl. .......................................... 709/227; 713/1

(58) Field of Classification Search .................. 713/1, 713/201, 2; 340/568.1, 572.1, 7.21; 711/162; 709/201, 213, 229, 205, 203, 226, 248, 250, 709/227; 345/333; 725/46; 370/466; 707/10
See application file for complete search history.

(56) References Cited

U.S. PATENT DOCUMENTS

| | | | | |
|---|---|---|---|---|
| 5,428,785 A * | 6/1995 | Morel et al. .................... 713/1 |
| 5,805,806 A * | 9/1998 | McArthur .................... 709/250 |
| 5,913,032 A * | 6/1999 | Schwartz et al. ........... 709/213 |
| 5,940,074 A * | 8/1999 | Britt, Jr. et al. ............. 345/333 |
| 5,963,134 A * | 10/1999 | Bowers et al. ........... 340/572.1 |
| 5,991,875 A * | 11/1999 | Paul .............................. 713/2 |
| 6,034,621 A * | 3/2000 | Kaufman .................... 340/7.21 |
| 6,173,376 B1 * | 1/2001 | Fowler et al. .............. 711/162 |
| 6,330,618 B1 * | 12/2001 | Hawkins et al. ............ 709/248 |
| 6,397,336 B2 * | 5/2002 | Leppek ........................ 713/201 |
| 6,424,260 B2 * | 7/2002 | Maloney .................. 340/568.1 |

(Continued)

FOREIGN PATENT DOCUMENTS

JP 03252263 * 11/1991

*Primary Examiner*—Jungwon Chang
(74) *Attorney, Agent, or Firm*—Yan Glickberg

(57) ABSTRACT

The invention relates to a system for supporting a plurality of activities which includes a plurality of terminals for interacting with said activities. The system allows the user to relocate activities from one terminal to another. The relocation can be simplified by means of a physical token representing the activity to be relocated. Terminals are coupled to receptacles for receiving the physical tokens. If a token is removed from a receptacle, the activity is associated with the token. If the token is inserted into another receptacle, the activity is resumed at the terminal coupled to the other receptacle.

21 Claims, 2 Drawing Sheets

U.S. PATENT DOCUMENTS

| | | | |
|---|---|---|---|
| 6,424,989 B1 * | 7/2002 | Shaw et al. | 709/201 |
| 6,523,067 B2 * | 2/2003 | Mi et al. | 709/229 |
| 6,532,488 B1 * | 3/2003 | Ciarlante et al. | 709/205 |
| 6,574,657 B1 * | 6/2003 | Dickinson | 709/203 |
| 6,625,169 B1 * | 9/2003 | Tofano | 370/466 |
| 6,654,746 B1 * | 11/2003 | Wong et al. | 707/10 |
| 6,671,724 B1 * | 12/2003 | Pandya et al. | 709/226 |

* cited by examiner

SYSTEM AND METHOD FOR SUPPORTING ONGOING ACTIVITIES AND RELOCATING THE ONGOING ACTIVITIES FROM ONE TERMINAL TO ANOTHER TERMINAL

FIELD OF THE INVENTION

The invention relates to a system for supporting a plurality of activities, which includes at least a first and a second terminal for interacting with said activities. The invention also relates to a method for supporting a plurality of activities on at least a first and a second terminal.

The invention also relates to a receptacle, a portable object and a terminal for use in the system according to the invention.

BACKGROUND OF THE INVENTION

A system as defined above is widely known. For example, in many households a system of various terminals is available for supporting a plurality of activities, which can be interacted with by means of said terminals, e.g. a television receiver allows a user to watch a broadcast program or a recorded program from a video recorder, a videophone allows a user to communicate with other persons, and a computer allows a user to perform various tasks such as internet browsing, e-mail and word-processing. Some activities may be interacted with on multiple kinds of equipment, e.g. a broadcast program can be watched on a television set or on a computer equipped with a TV tuner, while some digital TVs or set-top boxes allow a user to browse the internet on the TV screen. Households often have a number of TVs and computers scattered over a number of rooms. As a consequence, users have a choice where and on which terminal to start a specific activity. Recent developments enable such terminals to be interconnected by a home network, so that resources can be shared by the devices, e.g. printers, data storage and communication ports.

It is a drawback of the prior art system that the most appropriate terminal to start a specific activity often is not known beforehand. For example, the most appropriate terminal might be in a room containing specific documentation, or a room where the activity is not intrusive to other people or where privacy is guaranteed. If an activity has been started on a terminal which appears not to be the most appropriate one, the user has to log out from that terminal, log on to a more appropriate terminal, restart the activity and restore the state of the activity.

OBJECT AND SUMMARY OF THE INVENTION

It is an object of the invention to alleviate the disadvantage of the prior art as mentioned hereinbefore. To this end, the system according to the invention is characterized in that the system also includes relocation means for relocating a selected activity of said plurality of activities from the first terminal to the second terminal. In this way it is achieved that an activity can be moved to another terminal very easily while preserving the state of the activity as it existed when it was abandoned at the first terminal. For example, if the activity concerns an internet browsing session, the internet connection can be transferred from a digital set-top box to a personal computer, the internet browser at the personal computer is started and the current topic, e.g. a particular web page, is loaded. Whether the activity is stopped on the first terminal, in other words whether the relocation implies a 'move' or a 'copy' action, is a matter of choice, which may be dependent on the type of activity, e.g. in the case of a videophone activity it is probably appropriate to stop the activity on the first terminal.

A preferred embodiment of the system according to the invention is characterized in that the relocation means include a portable object, association means coupled to the first terminal in order to associate the selected activity with said portable object, and detection means coupled to the second terminal in order to detect said portable object and to identify the selected activity. In this embodiment an activity can be relocated by simply picking up a portable object and carrying it to the desired terminal on which the activity is to be continued. The portable object, or token, acts as a symbolic carrier of the activity. It can have any shape or size, but its size and weight are preferably optimal for carrying it in one hand. For example, a token may have the shape of a pen. Before the relocation it should be located near the association means which are located near the first terminal or near the entrance/exit of the room wherein the first terminal is located. When the user leaves the first terminal and picks up the portable object, the association means associate the selected activity with the portable object automatically. When the portable object is brought into the vicinity of the detection means coupled to the second terminal, it is detected, the associated activity is identified and the activity is started on the second terminal, thereby restoring the state of the selected activity as it existed before the relocation.

In a preferred embodiment, the system includes a communication network interconnecting the first and the second terminal. This embodiment is characterized in that the relocation means are also arranged to send a state of the selected activity, via the network, from the first terminal to the second terminal in response to the detection means detecting the portable object. The portable object can thus be very simply implemented. The only requirement is that it can be identified by the association means and detection means. All information about the associated activity and the state which existed before the relocation is communicated through the network. Any technology for identifying the portable object may be applied, e.g. the portable object may comprise a transponder, or it may have a unique appearance which is recognized by the association means and detection means.

An alternative embodiment is characterized in that the portable object includes storage means for storing a state of the selected activity, the detection means also being arranged to read said state from said storage means. In this embodiment the system need not include a network. All information concerning the associated activity and the state which existed before the relocation is now stored in the storage means of the portable object by the association means, and subsequently retrieved by the detection means. For example, in order to relocate the activity of watching a particular TV channel from a television receiver to a computer equipped with a TV tuner, a code indicating that the activity pertains to TV watching and an identity of the TV channel are to be stored into the storage means of the portable object. Similarly, in order to relocate an internet browsing activity, a code representing that kind of activity and the URL (Uniform Resource Locator) of the current and preceding web pages are to be stored in the storage means. For more complex tasks, the storage means should be capable of containing more information, for example, for relocating a word-processing activity, the storage means should be capable of storing the text file being processed and the identity and state of the word processor used.

A further embodiment is characterized in that the relocation means comprise further detection means coupled to the first terminal and further association means coupled to the second terminal in order to relocate the selected activity from the second to the first terminal. When both association means and detection means are coupled to every terminal of the system, activities can be relocated between any pair of terminals.

A further embodiment is characterized in that the relocation means also include, for each terminal, a receptacle coupled to that terminal in order to receive the portable object, the receptacle including the association means and the detection means coupled to that terminal. The association means, the detection means and a receptacle for the portable objects are thus combined into one device. Each receptacle is coupled to a terminal and located near that terminal or near the entrance/exit of the room wherein the first terminal is located. The connection between a receptacle and a terminal may be established by any suitable technique, e.g. through an infra-red connection. Preferably, the receptacle is capable of containing a plurality of tokens, because at each terminal enough tokens must be available to allow multiple activities to be relocated. When a token is removed from the receptacle, the association means register the identity of the token and associate it with the selected activity. If that same token is put into another receptacle, it is identified and its associated activity is started on the terminal coupled to the other receptacle.

A further embodiment is characterized in that the relocation means comprise survey means for presenting a survey of activities on at least the first and the second terminal. The survey may be a graphical representation wherein the various terminals and activities are represented by icons. The survey may provide an alternative way to relocate activities, e.g. by dragging an activity icon or groups of activity icons from one terminal icon to another terminal icon. This approach is more powerful, e.g. activities may be relocated from terminals which are located in different rooms without the need to visit those rooms. However, the approach is more complex and requires more user actions.

The invention is particularly suitable for home-networks or office-networks. Terminals need not be screen-based, e.g. the activity of watching a concert registration on a television receiver may be relocated to a destination terminal consisting of audio equipment only, causing only the audio information to be processed by the destination terminal.

BRIEF DESCRIPTION OF THE DRAWINGS

These and other aspects of the invention will be apparent from and elucidated, by way of non-limitative example, with reference to a drawing in which.

DESCRIPTION OF EMBODIMENTS

Figure 1:
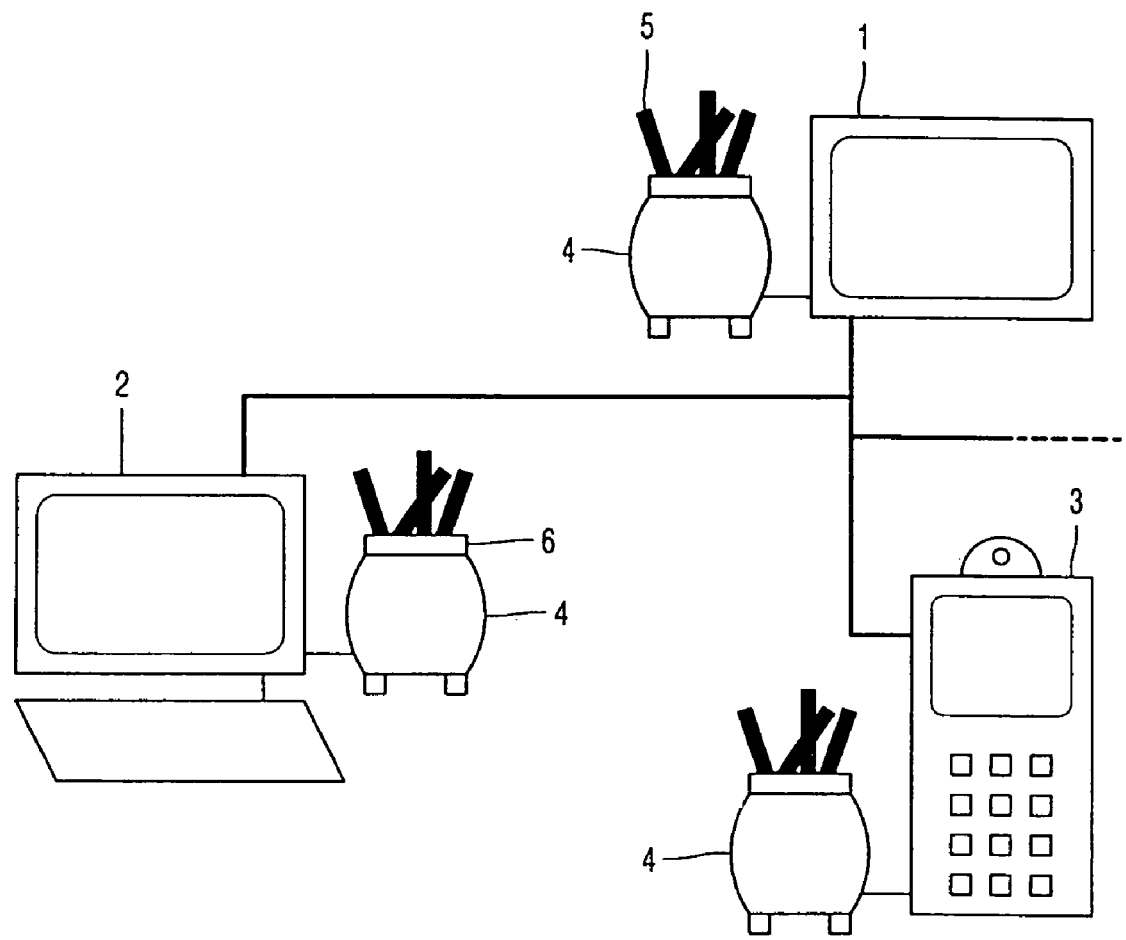
FIG. 1 shows a diagram of a home network as an embodiment of the system according to the invention.

FIG. 1 shows a home network comprising a plurality of terminals including inter alia a television receiver 1, a personal computer 2 and a videophone 3. To each of these terminals there is coupled a receptacle 4 capable of receiving a plurality of portable objects or tokens 5. Each token has a unique identity which can be recognized by a sensor, e.g. using transponder technology. When any of the tokens 5 is removed from any of the receptacles 4, the identity of the token is transmitted to the terminal coupled to the receptacle and one or more selected activities are associated with the token. When the token is inserted into another receptacle, the identity of the token is detected and the associated activities are started, thereby restoring for each activity the state existing before the relocation. To this end, each receptacle 4 includes a sensor 6, which acts as detection means for detecting the identity of the token. The sensor 6 and the relevant terminal constitute the association means for associating the token with the selected activities.

Activities may be selected for relocation in various ways. If a terminal is currently supporting only one activity, e.g. the television receiver 1 receiving and reproducing a broadcast program, this activity is automatically selected for relocation when a token 5 is removed from the receptacle 4 connected to the terminal.

Figure 2:
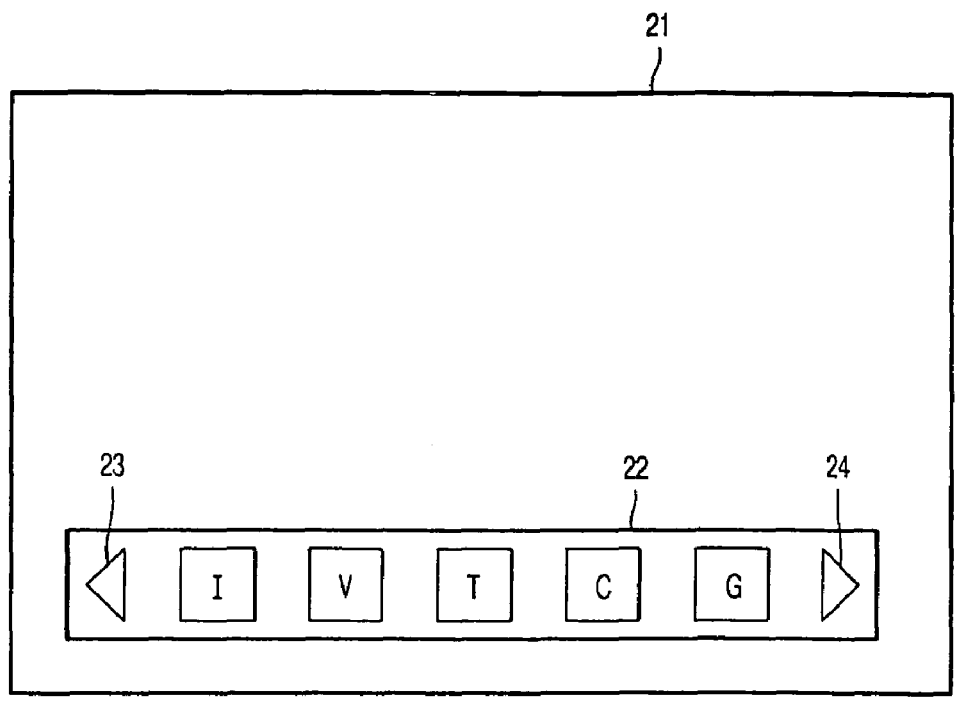
FIG. 2 shows an example of a screen representation of a user interface supporting the method according to the invention.

If a terminal is supporting multiple activities, e.g. the television receiver also runs an internet browsing session, the activity whereto user commands are currently directed, i.e. the 'foreground' activity, is automatically selected for relocation. Terminals which are capable of supporting multiple activities generally offer a tool for organizing and selecting activities. FIG. 2 shows an example of a screen representation 21 of a user interface supporting the organization and selection of activities. The user interface comprises a transitbar or taskbar 22 which contains icons representing the activities currently supported. The transitbar 22 covers a part of the screen. It could be slightly transparent to make it less annoying. The example of FIG. 2 shows current activities including an internet browsing session 'I', a video watching activity 'V', a telecommunication activity 'T', a CD player activity 'C' and a game activity 'G'. Instead of characters, graphical icons may be used to communicate aspects of the corresponding activity. Icons representing further current activities can be reached by means of the scroll buttons 23 and 24. The transitbar 22 supports local activity handling such as easy switching between activities, easy stopping activities, and is a placeholder for visual triggers such as from an incoming videophone-call. Furthermore, the transitbar 22 provides appropriate feedback on relocation operations without disturbing possible local activities of (other) users.

The transitbar 22 can be evoked by the user by pressing a dedicated button on the videophone 3 or the remote control (not shown) of the television receiver 1 and may be permanently visible on the personal computer 2. It also appears automatically when a terminal is switched on or a relocation operation is initiated or completed. Pressing the dedicated button again removes the transitbar 22 from the screen. The transitbar 22 will always disappear automatically after a given period of time, e.g. 10 seconds, during which user commands are absent. If the transitbar 22 is visible the user can navigate within the transitbar, e.g. using left/right arrow keys on the remote control (not shown) of the television receiver or the keyboard of the personal computer 2 and the videophone 3. A position within the transitbar 22 is indicated by a highlighted icon. If the transitbar 22 is not empty, there will always be exactly one foreground activity. After the transitbar 22 has been evoked, the icon corresponding to the foreground activity is highlighted. Highlighting another icon and pressing a confirmation ('OK') button (not shown) causes the corresponding activity to become the foreground activity. Activities can be added to the transitbar 22 in various ways. For example, an activity may be started using a dedicated button on the remote control of the television receiver 1 or an application finder on the personal computer 2. An activity can also be relocated from another location and finally it may also be an incoming videophone-call. Activities may be stopped, hence removed from the transitbar 22, by means of a dedicated control or activity menu.

Any of the tokens 5 can be used for relocating one ore more activities from one terminal to another, the terminals generally being located in different rooms. The token 5 is considered as a physical object representing the activity the user wishes to take to another location. The tokens 5 are present in any of the receptacles 4 before and after a relocation operation. The activity that is relocated can be selected implicitly or explicitly. If the transitbar 22 is not visible when the token 5 is removed from the receptacle 4, the foreground activity will be relocated. However, if the transitbar 22 is visible when the token 5 is removed from the receptacle 4, the activity that corresponds to the highlighted icon will be relocated. In a more advanced embodiment the user is allowed to select multiple icons, by making a distinction between navigation and highlighting, and to relocate them simultaneously with one token. A dedicated control or screen button could be added to enable all activities to be selected and relocated at once, e.g. if the user wishes to continue all activities in another room.

If the token 5 is removed from the receptacle 4 when a videophone call comes in and the transitbar 22 is not visible yet, the videophone activity is relocated. Generally speaking, the preferred operation is a 'copy' operation, thus continuing the relocated activity on the original terminal, however, for communication activities, such as a videophone call, a 'move' operation is more appropriate. A move operation can be achieved by first picking up the token 5 and then simply stopping the local activity. One can also switch off the terminal, thus emptying the whole local transitbar 22. As soon as the user removes the token 5 from the receptacle 4, the transitbar 22 appears (if it was not visible yet) and an animation shows that the selected activity icon is copied from the transitbar 22. Furthermore, visual feedback on the receptacle 4 indicates that a token is detected.

When the token 5 is inserted into the receptacle 4 (and is associated with a screen-related activity), the terminal coupled to the receptacle will be switched on if it was off. Furthermore, the transitbar 22 appears on the screen and the icon of the relocated activity is added to the transitbar 22 by animation. If the transitbar 22 was empty, the relocated activity is immediately resumed and started as a foreground activity. However, if the transitbar 22 already contained one or more icons, the activity is added to the transitbar 22 as a background activity.

Figure 3:
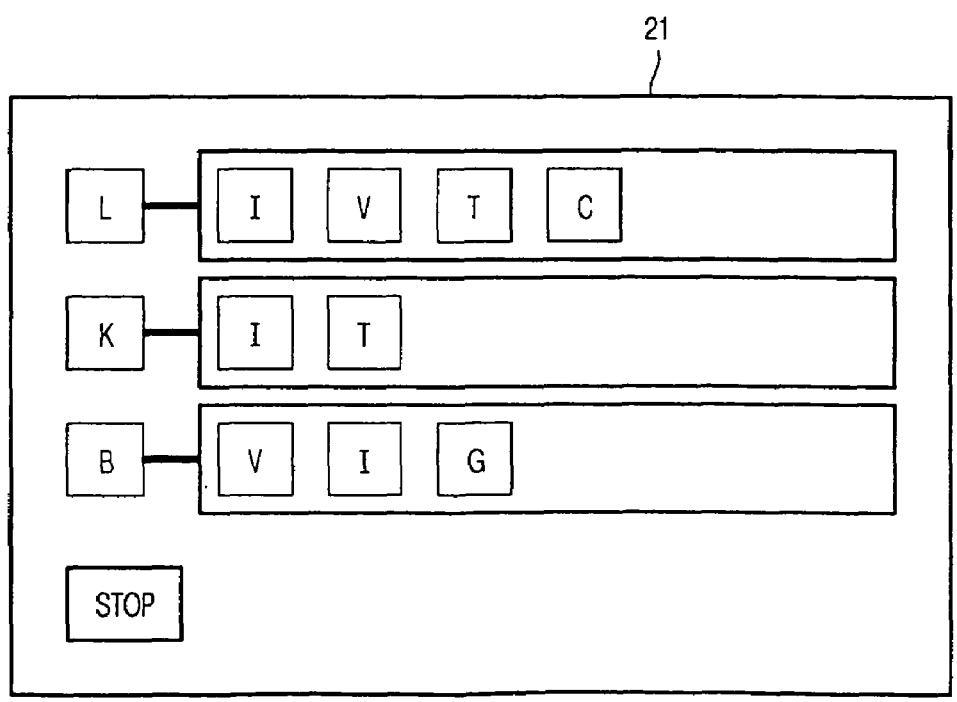
FIG. 3 shows a further example of a screen representation of a user interface supporting the method according to the invention.

FIG. 3 shows a screen representation of an alternative user interface supporting the organization and selection of activities. The user interface comprises a 'house-map' which provides a full-screen overview of all activities in the home. It represents the contents of the transitbar 22 of each terminal. The house-map of FIG. 3 shows a transitbar of the living room 'L', the kitchen 'K' and the bedroom 'B'. Instead of characters, graphical icons may be used to represent the various rooms or terminals. If there are too many rooms to be represented on one screen, vertical-scrolling buttons are applied, similar to the horizontal-scrolling buttons 23 and 24 of the transitbar 22. On the house-map, activities can be copied from one terminal to another. Furthermore, activities can be stopped easily. The house-map may be evoked or removed by a dedicated control or by starting and stopping it as a normal activity, e.g. using the transitbar 22. An activity can be copied by dragging the corresponding icon with a cursor control means, e.g. a computer mouse, provided that the terminal supports this approach. Alternatively, an icon can be selected by navigation, e.g. with up/down/left/right arrow keys, and selection as described hereinbefore. The selected activity can then be moved or copied to another terminal by means of, for example, the up/down arrow keys and the 'OK' button. A selected activity can be stopped by pressing the 'STOP' button. Instead of selecting individual activities, it is also possible to select all activities of a particular terminal by highlighting the icon corresponding to that terminal. The selected activities can then be stopped or relocated simultaneously.

In conformity with the token, the preferred operation on the house-map is a 'copy', except for communication activities for which it is a 'move'. For a video player (not shown), it will be a copy operation if the player supports multiple simultaneous output streams, otherwise it will be a 'mirror' operation (i.e. a copy with a shared source).

If an activity is relocated to a terminal which is switched off, the terminal will be switched on automatically. If the terminal is located in another room, the sound related to the activity will be faded in and, if possible, the image also appears gradually so as to avoid startling any persons present in the other room. If the house-map is used to stop an activity on another terminal and this activity was the only local activity, the other terminal will be switched off automatically.

Although the invention has been described with reference to particular illustrative embodiments, variations and modifications are possible within the scope of the inventive concept. Thus, for example, in an advanced embodiment the need for a physical token may be evaded by applying sophisticated devices for identifying persons, e.g. by means of fingerprint recognition. Instead of carrying a token from one terminal to another, in that case the user need only identify him/herself, e.g. by pressing a finger against a fingerprint recognizer, by uttering a spoken command to a voice recognizer, or by means of a personal identification card, and repeat this simple operation at the destination terminal. The relocated activity thus is not associated with a physical token carried by a person but directly with the person.

Tokens may have only a temporary identity during the relocation, which identity is assigned upon remove of the token from a receptacle. This identity is stored in the token, e.g. on a magnetic strip. Instead of assigning an identity to a token, one could also store the identities of the activities to be relocated and the identity of the terminal starting into the token. The destination terminal can then determine which activities to resume and from which terminal they originate. Furthermore, tokens may include controls themselves for selecting activities to be relocated. For example, a token may serve as a limited remote control, comprising buttons for evoking the transitbar, moving the highlight and confirming a selection. Alternatively, a token may serve as a pointing device, allowing a user to select an activity by pointing the token at an icon on the screen.

The relocation process may also be performed automatically, by detecting the presence of, and identifying, a person in the vicinity of a terminal. For example, the person may carry a token which can be localized automatically. This may be achieved in known ways by means of, for example, mobile communication or transponder technology. An activity on a first terminal may be interrupted when the user of the terminal is detected to leave the area or the room wherein the terminal is located. Subsequently, the activity is resumed on a second terminal in response to the detection of the same person entering the area or room in which the second terminal is located. In this way it is achieved that the user does not need to perform an explicit action in order to relocate an activity. Advantageously, such a token may be constituted by, or incorporated in, a mobile telephone, e.g. a GSM phone, because such a phone is normally carried by one person and can be localized using the registration-signals emitted.

If the activity pertains to playing a stored program, e.g. a movie from a video recorder, the activity could be interrupted during the relocation. If the relocation is established by means of the house-map, the activity could be interrupted for a predetermined period of time, thus giving the user time to move to the other location. If the activity pertains to watching a broadcast program, the rest of the broadcast program could be recorded in response to the initiation of a relocation operation. When the activity is resumed after some period of time, possibly on the same terminal, the program is played back from the point where it was interrupted by the relocation. Relocation 'in time' is thus accomplished. If the system includes a storage device which is capable of simultaneously storing and retrieving information, the broadcast program may even be resumed before the broadcast ends.

In summary, the invention relates to a system for supporting a plurality of activities which includes a plurality of terminals for interacting with said activities. The system allows the user to relocate activities from one terminal to another. The relocation can be simplified by means of a physical token representing the activity to be relocated. Terminals are coupled to receptacles for receiving the physical tokens. If a token is removed from a receptacle, the activity is associated with the token. If the token is inserted into another receptacle, the activity is resumed at the terminal coupled to the other receptacle.

The invention claimed is:

1. A system comprising:
   a first terminal,
   a second terminal,
   a relocation system that is configured to relocate interactive ongoing activity from the first terminal to the second terminal, while allowing the interactive ongoing activity to continue at the first terminal and the second terminal,
   a portable device that is configured to store information associated with the ongoing activity,
   a communication network interconnecting the first and the second terminal, wherein
   the relocation system is arranged to send a state of the ongoing activity, via the network, from the first terminal to the second terminal in response to a detector detecting the portable device.

2. A system as claimed in claim 1, wherein
   the detector is coupled to the second terminal in order to detect the portable device and to identify the ongoing activity.

3. A system as claimed in claim 1, wherein
   the portable device includes a memory for storing a state of the ongoing activity,
   the detector being arranged to read the state from the memory.

4. A system as claimed in claim 1, wherein
   the relocation system comprises
      a further detector coupled to the first terminal and the portable device is further configured to store information associated with a second ongoing activity to facilitate relocating the second ongoing activity from the second to the first terminal.

5. A system as claimed in claim 4, wherein
   the relocation system also includes, for each terminal, a receptacle coupled to the terminal in order to receive the portable device,
   the receptacle includes the detector and is further configured to read and write the information from and to the portable device.

6. A system as claimed in claim 5, wherein
   the relocation system comprises survey means for presenting a survey of activities on at least the first and the second terminals.

7. A portable device for use in a system as claimed in claim 1, being
   responsive to association means for associating the ongoing activity with the portable device and
   responsive to a detector that detects the portable device and identifies the ongoing activity.

8. A receptacle for use in a system as claimed in claim 1, including
   association means for associating the ongoing activity with a portable device and
   a detector that is configured to detect the portable device and to identify the ongoing activity associated with the portable device.

9. A terminal for use in a system as claimed in claim 1, including
   association means for associating the ongoing activity with a portable device and
   a detector that is configured to detect the portable device and to identify the ongoing activity associated with the portable device.

10. The system as claimed in claim 1, wherein
    the relocation system includes an interactive menu, wherein a user selects the ongoing activity, and identifies the second terminal for relocating the ongoing activity.

11. A receptacle operably coupled to a terminal for interacting with one or more on-going activities and including a port that is configured to receive a portable device, the receptacle configured to:
    associate a current on-going activity of the terminal with the portable device based upon a departure of the portable device from the port,
    enable an interactive on-going activity that is associated with the portable device to become a current interactive on-going activity of the terminal, without the on-going activity being restarted, based upon an arrival of the portable device at the port,
    determine an identifier of the portable device and query at least one other receptacle associated with the terminal with the identifier, upon the arrival of the portable device, to request parameters corresponding to the on-going activity that is associated with the portable device, and
    store the identifier of the portable device upon the departure of the portable device, and communicate parameters corresponding to the current on-going activity to another receptacle associated with the terminal upon receipt of the identifier from the other receptacle associated with the terminal.

12. The receptacle of claim 11, wherein
    the port includes a communications port, and the arrival and departure correspond respectively to a commencement and termination of communications.

13. The receptacle of claim 11, wherein the receptacle is configured to:
   read parameters from the portable device corresponding to the activity associated with the portable device upon the arrival of the portable device and
   write parameters corresponding to the current activity to the portable device prior to or during the departure of the portable device.

14. A system comprising:
   a first terminal,
   a second terminal,
   a network that is configured to couple the first terminal and the second terminal,
   a relocation system that is configured to relocate simultaneously or separately a plurality of ongoing activities from the first terminal to the second terminal without terminating all activity at the first terminal or restarting the ongoing activities at the second terminal, the relocation system being arranged to send a state of the ongoing activity, via the network, from the first terminal to the second terminal in response to a detector detecting a portable device, said portable device being configured to store information that facilitates relocation of an ongoing activity to the second terminal via a transport of the portable device from a vicinity of the first terminal to a vicinity of the second terminal, while permitting the ongoing activity to continue at the first terminal.

15. A system comprising:
   a first terminal,
   a second terminal, and
   a relocation system that is configured to relocate simultaneously or separately a plurality of ongoing activities from the first terminal to the second terminal without terminating all activity at the first terminal or restarting the ongoing activities at the second terminal, the relocation system including:
      a portable device that is configured to store information that facilitates relocation of an ongoing activity to the second terminal via a transport of the portable device from a vicinity of the first terminal to a vicinity of the second terminal, such that one or more ongoing activities are terminated at the first terminal, while other activities continue at the first terminal.

16. The system of claim 15, wherein the relocation system includes
   an interactive menu that is configured to allow a user to select one or more ongoing activities or organize a plurality of ongoing activities to relocate to the second terminal.

17. A system comprising
   a first terminal,
   a second terminal,
   a relocation system that is configured to relocate an ongoing activity from the first terminal to the second terminal, restoring the state of the ongoing activity at the second terminal as the state existed before the relocation,
   the ongoing activity being selectively terminated or continued at the first terminal, based on a type of the ongoing activity, and
   a network that is configured to couple the first terminal and the second terminal,
   wherein
   the relocation system is arranged to send a state of the ongoing activity, via the network, from the first terminal to the second terminal in response to a detector detecting the portable device.

18. The system of claim 17, wherein the relocation system includes:
   a portable device that is configured to store information that facilitates the relocation of the ongoing activity to the second terminal via a transport of the portable device from a vicinity of the first terminal to a vicinity of the second terminal.

19. A method for supporting a plurality of activities on at least a first and a second terminal, wherein the method includes:
   providing a series of graphical representations each representing an ongoing activity on the first terminal, the graphical representation for a given ongoing activity being selected to facilitate associating the given ongoing activity with the second terminal,
   permitting a user to scroll through the series of graphical representations and select a graphical representation associated with the ongoing activity the user desires to relocate from the first terminal to the second terminal,
   relocating the user selected ongoing activity from the first terminal to the second terminal in a preserved state existing before relocation while continuing the selected ongoing activity on the first terminal.

20. A method as claimed in claim 19, wherein the method also includes:
   associating the ongoing activity on the first terminal with a portable device at the second terminal,
   detecting the portable device, and
   identifying the ongoing activity in order to relocate the ongoing activity to the second terminal.

21. A method for supporting a plurality of activities on at least a first and a second terminal, wherein the method includes:
   providing a graphical representation of each of a plurality of ongoing activities, the graphical representation for a given ongoing activity being selected to facilitate associating the ongoing activity with a portable device at the second terminal, the plurality of ongoing activities including at least one of an internet browsing session, a video-watching activity, a telecommunication activity, a compact disc-playing activity, and a gaming activity,
   selecting an ongoing activity of the selected graphical representation from the plurality of ongoing activities,
   relocating the selected ongoing activity from the first terminal to the second terminal in a preserved state existing before relocation while continuing the ongoing activity on the first terminal.

* * * * *